US012687845B2

(12) United States Patent
Iwanaga et al.

(10) Patent No.: US 12,687,845 B2
(45) Date of Patent: Jul. 21, 2026

(54) CONDITION MONITORING SYSTEM AND DATA ANALYZER

(71) Applicant: NTN Corporation, Osaka (JP)

(72) Inventors: Hiroyuki Iwanaga, Kuwana (JP); Takashi Haseba, Kuwana (JP)

(73) Assignee: NTN Corporation, Osaka (JP)

( * ) Notice: Subject to any disclaimer, the term of this patent is extended or adjusted under 35 U.S.C. 154(b) by 414 days.

(21) Appl. No.: 18/025,872

(22) PCT Filed: Sep. 9, 2021

(86) PCT No.: PCT/JP2021/033124
§ 371 (c)(1),
(2) Date: Mar. 10, 2023

(87) PCT Pub. No.: WO2022/070822
PCT Pub. Date: Apr. 7, 2022

(65) Prior Publication Data
US 2023/0359192 A1 Nov. 9, 2023

(30) Foreign Application Priority Data

Sep. 29, 2020 (JP) ................................. 2020-163942

(51) Int. Cl.
*G05B 23/02* (2006.01)

(52) U.S. Cl.
CPC ..... *G05B 23/0283* (2013.01); *G05B 23/0294* (2013.01)

(58) Field of Classification Search
CPC ............ G05B 23/0283; G05B 23/0294; G05B 23/0221; G05B 23/02; G01M 13/045; G01M 99/00
See application file for complete search history.

(56) References Cited

U.S. PATENT DOCUMENTS

2010/0063762 A1 3/2010 Pechstein et al.
2015/0234897 A1 8/2015 Kuninobu et al.
(Continued)

FOREIGN PATENT DOCUMENTS

CN 102144158 A 8/2011
CN 102870057 A 1/2013
(Continued)

OTHER PUBLICATIONS

International Search Report issued in International Application No. PCT/JP2021/033124, dated Nov. 16, 2021, with English translation.

*Primary Examiner* — Stephen D Meier
*Assistant Examiner* — Leo T Hinze
(74) *Attorney, Agent, or Firm* — Rimon P.C.

(57) ABSTRACT

A condition monitoring system includes a data measurement device, a data analyzer, and a diagnosis device. The data measurement device obtains, according to a measurement condition provided, measurement data from a detection signal of a sensor. The data analyzer performs an analysis process on the measurement data obtained by the data measurement device. The diagnosis device performs a diagnosis process of diagnosing a condition of a facility based on an analysis result obtained through the analysis process. The data analyzer sets the measurement condition and an analysis condition for the analysis process based on a time required for the analysis process and the diagnosis process.

6 Claims, 6 Drawing Sheets

100

(56)                    References Cited

U.S. PATENT DOCUMENTS

| | | | |
|---|---|---|---|
| 2016/0123840 A1 | 5/2016 | Takada et al. | |
| 2019/0271974 A1 | 9/2019 | Suzuki et al. | |
| 2020/0196032 A1 | 6/2020 | Schmitz et al. | |
| 2022/0252473 A1* | 8/2022 | Michiwaki | G01M 99/00 |

FOREIGN PATENT DOCUMENTS

| | | | |
|---|---|---|---|
| CN | 105209995 | A | 12/2015 |
| CN | 111379550 | A | 7/2020 |
| DE | 102018009825 | A1 | 6/2020 |
| JP | H08-145854 | A | 6/1996 |
| JP | 2007-241572 | A | 9/2007 |
| JP | 2013-164386 | A | 8/2013 |
| JP | 2017-150887 | A | 8/2017 |
| JP | 2017-157072 | A | 9/2017 |
| JP | 2018-092310 | A | 6/2018 |
| JP | 2019-173706 | A | 10/2019 |

* cited by examiner

FIG.3

<MEASUREMENT CONDITION SETTING TABLE>

| ID | MEASUREMENT ITEM | INITIAL SETTING VALUE | SETTING VALUE (WORST-CASE CONDITION) | SETTING VALUE (DESIRED CONDITION) | SETTING VALUE (BEST-CASE CONDITION) |
|----|------------------|-----------------------|--------------------------------------|-----------------------------------|-------------------------------------|
| 0 | MEASUREMENT INTERVAL [sec] | 5 | 10 | 3 | 1 |
| 1 | MEASUREMENT TIME [sec] | 5 | 5 | 2 | 0.5 |
| 2 | SAMPLING FREQUENCY [Hz] | 2000 | 1000 | 2500 | 4000 |
| ... | ... | ... | ... | ... | ... |

FIG.4

<ANALYSIS LEVEL SETTING TABLE>

| ID | MEASUREMENT EFFICIENCY R | ANALYSIS LEVEL |
|---|---|---|
| 0 | $0 \leq R < 0.5$ | 3 |
| 1 | $0.5 \leq R < 0.8$ | 2 |
| 2 | $R \geq 0.8$ | 1 |

FIG.5

<ANALYSIS PROCESS SETTING TABLE>

| ID | CALCULATION TYPE | CALCULATION PARAMETER | DIAGNOSIS LEVEL | ANALYSIS LEVEL |
|---|---|---|---|---|
| 0 | RMS | f01~f02 kHz | 0 | 1 |
| 1 | FFT | f11~f12 kHz | 0 | 2 |
| 2 | CF | f21~f22 kHz | 0 | 3 |
| 3 | RMS | f31~f32 kHz | 1 | 1 |
| 4 | FFT | f41~f42 kHz | 1 | 2 |
| 5 | CF | f51~f52 kHz | 1 | 3 |
| 6 | RMS | f61~f62 kHz | 2 | 1 |
| 7 | FFT | f71~f72 kHz | 2 | 2 |
| 8 | CF | f81~f82 kHz | 2 | 3 |

CONDITION MONITORING SYSTEM AND DATA ANALYZER

CROSS-REFERENCE OF RELATED APPLICATIONS

This application is the U.S. National Phase under 35 U.S.C. § 371 of International Patent Application No. PCT/JP2021/033124, filed on Sep. 9, 2021, which in turn claims the benefit of Japanese Patent Application No. 2020-163942, filed on Sep. 29, 2020, the entire disclosures of which Applications are incorporated by reference herein.

TECHNICAL FIELD

The present invention relates to a condition monitoring system and a data analyzer.

BACKGROUND ART

A condition monitoring system is known that performs an analysis process, such as calculation of an effective value and frequency analysis, on measurement data collected using a sensor installed in a facility, and monitors the condition of the facility based on a result of the analysis process.

For example, Japanese Patent Laying-Open No. 2019473706 (PTL 1) discloses a monitoring system for a wind power plant. In this monitoring system, each wind power generator includes a condition monitoring device that monitors a condition of its own wind power generator using measurement data (first data) collected by its own wind power generator and measurement data (second data) obtained from another wind power generator via a communication device. When an operating condition of the other wind power generator matches an operating condition of its own wind power generator, the condition monitoring device obtains the second data synchronized with the first data from the other wind power generator, and based on a degree of variation in collection data including the first data and the second data, monitors the condition of its own wind power generator (see PTL 1).

CITATION LIST

Patent Literature

PTL 1: Japanese Patent Laying-Open No. 2019-173706

SUMMARY OF INVENTION

Technical Problem

In some cases, real-time condition monitoring is required for a condition monitoring system that monitors a condition of a facility. For example, at a production site or the like, when an analysis process such as frequency analysis is performed on facility measurement data (e.g., vibration data) and the facility is diagnosed based on a result of the analysis process, any diagnosis result that lacks responsiveness can lead to delays in detection of an anomaly in the facility and a response to the anomaly. In such a case, the analysis process on measurement data and a diagnosis process based on the analysis result are required to be performed in real time. The real-time process is not considered specifically in PTL 1.

The present invention has been made to solve the above problem. An object of the present invention is to ensure a real-time process in a condition monitoring system that monitors a condition of a facility.

Solution to Problem

A condition monitoring system according to the present invention is a condition monitoring system that monitors a condition of a facility. The condition monitoring system includes a sensor attached to the facility, a data measurement device, a data analyzer, and a diagnosis device. The data measurement device receives a detection signal of the sensor and obtains, according to a measurement condition provided, measurement data from the detection signal of the sensor. The data analyzer receives the measurement data from the data measurement device and performs an analysis process on the measurement data. The diagnosis device performs a diagnosis process of diagnosing the condition of the facility based on an analysis result obtained through the analysis process. The data analyzer sets the measurement condition and an analysis condition for the analysis process based on a time required for the analysis process and the diagnosis process.

A data analyzer according to the present invention is a data analyzer that performs an analysis process on measurement data received from a data measurement device. The data measurement device is configured to obtain, according to a measurement condition provided, the measurement data from a detection signal of a sensor attached to a facility. The data analyzer includes a calculator and a calculation controller. The calculator performs the analysis process on the measurement data. The calculation controller sets the measurement condition and an analysis condition for the analysis process based on a time required for the analysis process and a diagnosis process of diagnosing a condition of the facility based on an analysis result obtained through the analysis process.

In the condition monitoring system and the data analyzer described above, the measurement condition of the data measurement device and the analysis condition for the analysis process are set based on the time required for the analysis process on the measurement data and a diagnosis process based on a result of the analysis process. The measurement condition and the analysis condition can thus be set such that the time required for the analysis process and the diagnosis process does not exceed a measurement interval of the measurement data. Accordingly, the condition monitoring system and the data analyzer can ensure a real-time process.

Preferably, the data analyzer (calculation controller) sets the measurement condition based on a measurement efficiency indicating a relation between a measurement interval of the measurement data in the data measurement device and the time required for the analysis process and the diagnosis process.

More preferably, the data analyzer (calculation controller) sets the measurement condition based on a measurement efficiency indicating a relation between a measurement interval of the measurement data in the data measurement device and the time required for the analysis process and the diagnosis process as well as a communication time.

More preferably, the data analyzer (calculation controller) sets the analysis condition based on the measurement efficiency.

More preferably, the data analyzer (calculation controller) sets the analysis condition based on the measurement efficiency and a result of the diagnosis process.

Preferably, the data analyzer (calculation controller) sets the analysis condition when the measurement condition set based on the measurement efficiency is not included in a prescribed adjustment range.

Preferably, the sensor includes at least one of a vibration sensor, a temperature sensor, a pressure sensor, a strain Sensor, and a load sensor.

Advantageous Effects of Invention

According to the present invention, a real-time process can be ensured in a condition monitoring system that monitors a condition of a facility.

BRIEF DESCRIPTION OF DRAWINGS

FIG. 3 shows an example measurement condition setting table included in a calculation condition file.

FIG. 4 shows an example analysis level setting table included in the calculation condition file.

FIG. 5 shows an example analysis process setting table included in the calculation condition file.

DESCRIPTION OF EMBODIMENTS

Figure 1:
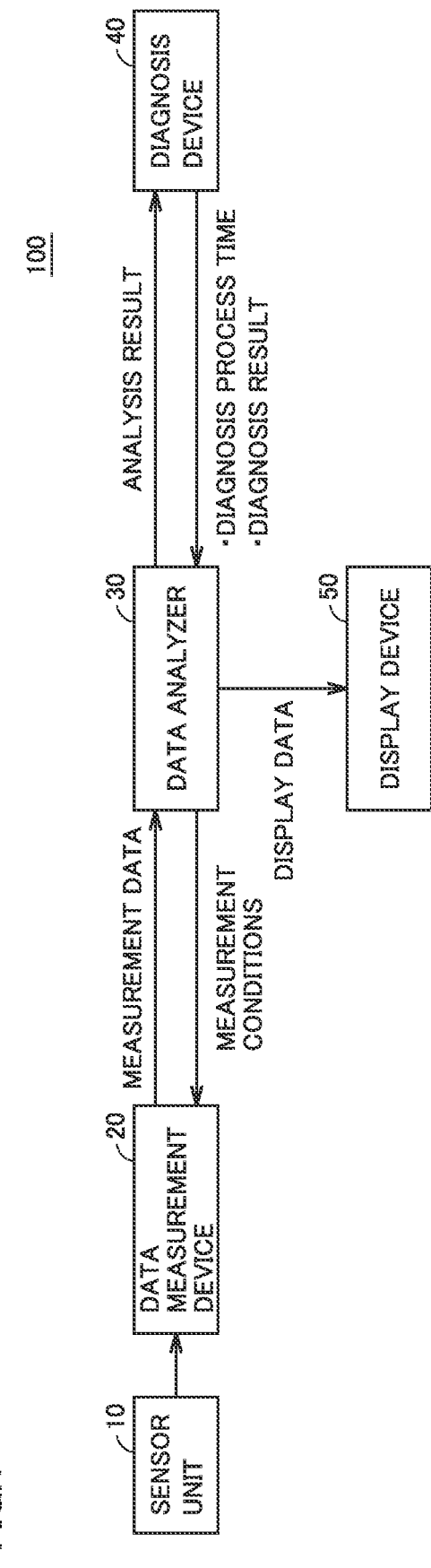
FIG. 1 is a block diagram schematically showing an overall configuration of a condition monitoring system according to an embodiment of the present invention.

An embodiment of the present invention will be described below in detail with reference to the drawings. The same or corresponding parts in the drawings have the same reference characters allotted, and description thereof will not be repeated.

FIG. 1 is a block diagram schematically showing an overall configuration of a condition monitoring system according to an embodiment of the present invention. Referring to FIG. 1, a condition monitoring system 1401 includes a sensor unit 10, a data measurement device 20, a data analyzer 30, a diagnosis device 40, and a display device 50.

Sensor unit 10 includes various sensors attached to a facility. For example, when condition monitoring system 100 monitors a condition of a wind power generation facility, sensor unit 10 includes a vibration sensor that detects vibrations of a main bearing. The sensor included in sensor unit 10 is not limited to the vibration sensor and may be a temperature sensor, a pressure sensor, a strain sensor, a load sensor, or any other sensor. Description will be given below assuming that sensor unit 10 includes the vibration sensor.

Data measurement device 20 receives a detection signal (analog signal) of a sensor from sensor unit 10. Data measurement device 20 is, for example, a data logger or a programmable logic controller (PLC). Data measurement device 20 obtains measurement data from the detection signal of the sensor according to measurement conditions set by data analyzer 30. The measurement conditions are, for example, a measurement interval of measurement data, a measurement time, and a sampling frequency.

More specifically, the measurement interval corresponds to a transmission interval of measurement data from data measurement device 20 to data analyzer 30. Data analyzer 30 performs an analysis process on a set of measurement data for each measurement interval, and diagnosis device 40 performs a diagnosis process using a result of the analysis process. The measurement time is a time at which measurement is actually performed within the measurement interval in data measurement device 20, and the measurement interval may be equal to the measurement time. The sampling frequency is a frequency at which the detection signal (analog signal) from sensor unit 10 is sampled.

Data analyzer 30 is composed of a central processing unit (CPU), a read only memory (ROM), a random access memory (RAM), and the like, which are not shown. The CPU deploys a program stored in the ROM to the RAM or the like and executes the program. The program stored in the ROM refers to a program in which a procedure of data analyzer 30 is described. Data analyzer 30 is configured, for example, on-premises or on a cloud.

Data analyzer 30 receives, from data measurement device 20, measurement data obtained according to the measurement conditions in data measurement device 20. Data analyzer 30 then performs the analysis process on the measurement data. The analysis process includes, for example, a process of calculating a root mean square (RMS) of measurement data, a process of analyzing a frequency by fast Fourier transform (FFT) of measurement data, and a process of calculating a crest factor (CF) of measurement data. Data analyzer 30 then transmits a result of the analysis process (hereinafter, which may also be referred to as "analysis result") to diagnosis device 40.

Diagnosis device 40 is also composed of a CPU, a ROM, a RAM, and the like, which are not shown. The program stored in the ROM refers to a program in which a procedure of diagnosis device 40 is described. Diagnosis device 40 is also configured, for example, on-premises or on a cloud, and is configured to communicate with data analyzer 30 via a communication system such as a local area network (LAN) or the Internet, or an external system.

Diagnosis device 40 receives an analysis result of measurement data from data analyzer 30. Diagnosis device 40 then performs, based on the analysis result, a diagnosis process of diagnosing a condition of a facility that has collected data by sensor unit 10. For example, when bearing vibration data is collected by the vibration sensor, the diagnosis process includes a process of comparing the analysis result (such as RMS, FFT spectrum, and CF of the vibration data) with a prescribed threshold to diagnose a damage level of the bearing. Diagnosis device 40 then transmits a result of the diagnosis process (hereinafter, which may also be referred to as "diagnosis result") to data analyzer 30. Diagnosis device 40 also transmits a time required for the diagnosis process (diagnosis process time) to data analyzer 30.

Condition monitoring system 100 monitors a condition of a wind power generation facility, for example, and real-time condition monitoring is required for such a condition monitoring system 100. In other words, the analysis process and the diagnosis process on the measurement data for each measurement interval are required to complete within the measurement interval. If the analysis process and the diagnosis process do not complete within the measurement interval, data backlog is accumulated, which may necessitate any action for missing data or interrupted diagnosis. While such an action is being performed, the real-time process is compromised, and a real-time diagnosis cannot be made. This causes delays in detection of an anomaly in the facility and a response to the anomaly.

In recent years, computational burdens of the analysis process and the diagnosis process have increased for monitoring a condition of a facility more extensively for a highly reliable diagnosis, and accordingly, ensuring a real-time process has become an issue. Although introduction of high-performance hardware is one idea to address such an issue, it may be very costly to introduce high-performance hardware, and accordingly, it is desired to ensure a real-time process at a low cost.

In condition monitoring system 100 according to the present embodiment, thus, data analyzer 30 sets measurement conditions of data measurement device 20 and an analysis condition for the analysis process based on a time required for the analysis process (hereinafter, also referred to as "analysis process time" and a time required for the diagnosis process (hereinafter, also referred to as "diagnosis process time") in diagnosis device 40. The analysis condition for the analysis process is a condition that specifies the details of the analysis process. In the present embodiment, the analysis condition specifies, for example, whether the analysis calculation of any of the RMS, FFT spectrum, and CF is performed, and a passband for the filter process on measurement. The analysis process is not limited to the RMS, FFT spectrum, and CF.

Setting the measurement conditions of data measurement device 20 and the analysis condition for the analysis process based on the analysis process time and the diagnosis process time can set the measurement conditions and the analysis condition such that the time required for the analysis process and the diagnosis process does not exceed the measurement interval of the measurement data. Condition monitoring system 100 can thus ensure a real-time process.

Display device 50 receives various display data from data analyzer 30 and displays the received display data on a screen. For example, display device 50 receives, as the display data, the measurement data obtained by data measurement device 20 the result of the analysis process (analysis result) of data analyzer 30, the result of the diagnosis process (diagnosis result) of diagnosis device 40, various setting information including the measurement conditions and the analysis condition for the analysis process which have been set by data analyzer 30, or the like, and displays it on the screen.

Figure 2:
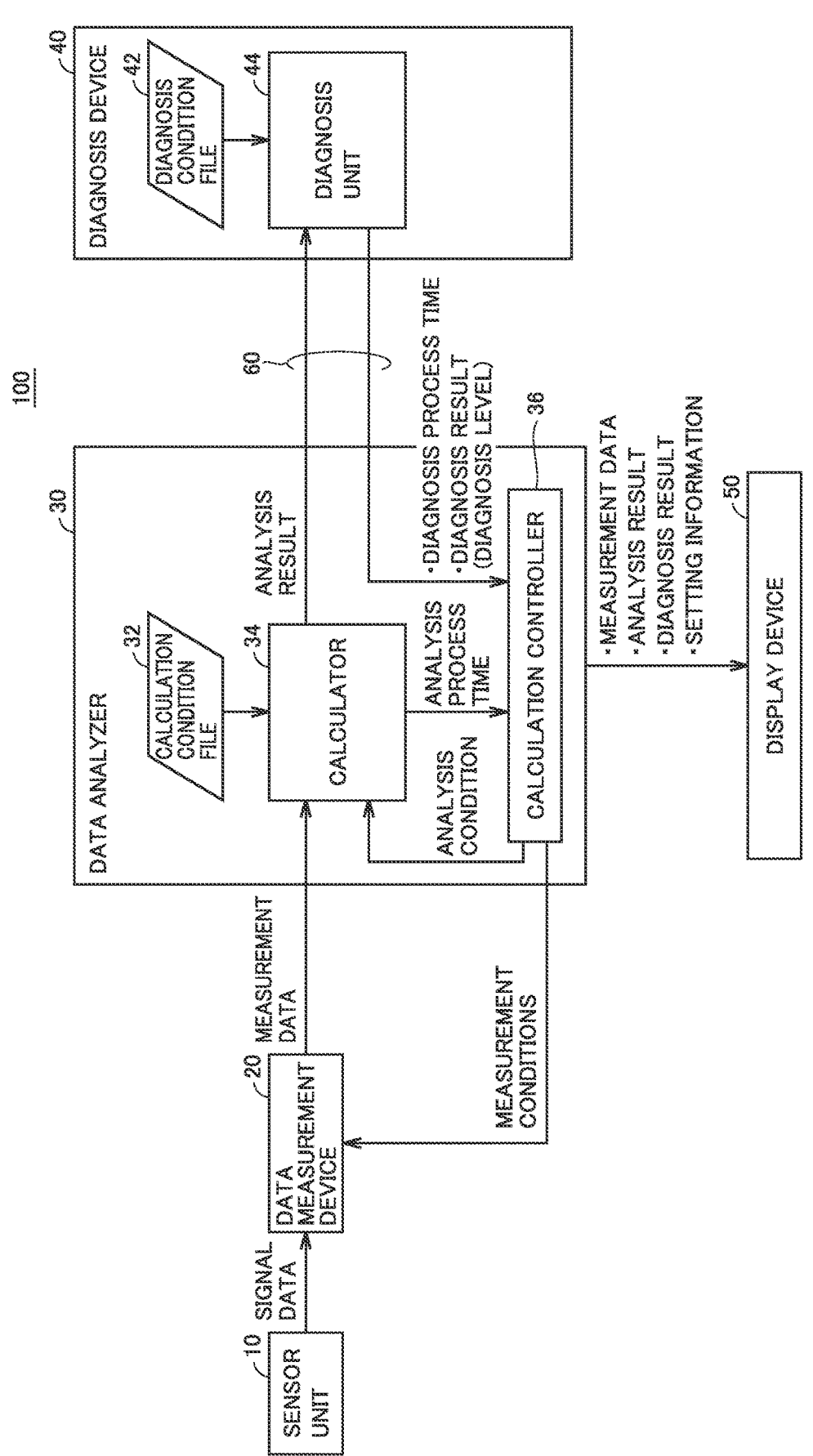
FIG. 2 shows a configuration of the condition monitoring system shown in FIG. 1 in more detail.

FIG. 2 shows a configuration of condition monitoring system 100 shown in FIG. 1 in more detail. Referring to FIG. 2, data analyzer 30 includes a calculation condition file 32, a calculator 34, and a calculation controller 36.

Calculator 34 receives, from data measurement device 20, measurement data collected according to the measurement conditions in data measurement device 20. Calculator 34 also receives, front calculation controller 36, the analysis condition for the analysis process which is set by calculation controller 36. Calculator 34 then performs the analysis process on the measurement data received from data measurement device 20, according to the analysis condition. The analysis condition and the analysis process will be described below in detail.

Calculator 34 transmits the result of the analysis process to diagnosis device 40. In this example, data analyzer 30 and diagnosis device 40 are connected via communication system 60 such as the Internet or a local area network (LAN), and the analysis result is transmitted to diagnosis device 40 via communication system 60.

Further, calculator 34 counts a time required for the analysis process (analysis process time). Calculator 34 then outputs the counted analysis process time to calculation controller 36.

Calculation controller 36 obtains calculation condition file 32 for setting the measurement conditions and the analysis condition. Calculation condition file 32 will be described below in detail. Calculation controller 36 also receives, from calculator 34, an analysis process time counted in calculator 34. Calculation controller 36 further receives, from diagnosis device 40 via communication system 60, a result of a diagnosis process (diagnosis result) in diagnosis device 40 based on the result of the analysis process (analysis result) by calculator 34 and the time required for the diagnosis process (diagnosis process time).

Calculation controller 36 then sets measurement conditions of data measurement device 20 and the analysis condition for the analysis process performed in calculator 34, with reference to calculation condition file 32 and based on the analysis process time received from calculator 34 and the diagnosis process time received from diagnosis device 40. A Method of setting the measurement conditions and the analysis condition will be described below in detail.

In setting the measurement conditions and the analysis condition, calculation controller 36 calculates a turnaround time for the overall process including the analysis process and the diagnosis process. For example, calculation controller 36 calculates, as the turnaround time, the total time of the analysis process time received from calculator 34 and the diagnosis process time received from diagnosis device 40.

The method of calculating the turnaround time is not limited thereto. For example, the turnaround time may be a difference between a time at which data analyzer 30 obtains measurement data from data measurement device 20 and a time at which data analyzer 30 obtains a diagnosis result from diagnosis device 40. Also in this case, the turnaround time includes the analysis process time and the diagnosis process time.

Calculation controller 36 then calculates a "measurement efficiency" indicating the relation between the measurement interval of the measurement data and the turnaround time of the overall process including the analysis process and the diagnosis process. In the present embodiment, the measurement efficiency is indicated by the ratio between the measurement interval and the turnaround time, as represented by the following equation.

$$\text{Measurement Efficiency} = \text{Turnaround Time}/\text{Measurement Interval} \qquad (1)$$

Preferably, communication system 60 counts a communication time between data analyzer 30 and diagnosis device 40. Alternatively, calculator 34 outputs an analysis process end time to calculation controller 36, diagnosis device 40 outputs a diagnosis process start time and a diagnosis process end time to calculation controller 36 via communication system 60, and calculation controller 36 adds up the difference between the analysis process end time and the diagnosis process start time and the difference between the diagnosis process end time and the time of the receipt of the diagnosis result, and counts a time required for (bidirectional) communication of communication system 60. Calculation controller 36 then calculates a turnaround time of the overall process, which includes the time requited for the analysis process and the diagnosis process and a communication time of communication system 60, and calculates a measurement efficiency from the calculated turnaround time and the measurement interval of the measurement data.

How to express a measurement efficiency is not limited thereto, and for example, the measurement efficiency may be expressed by the difference between the measurement interval and the turnaround time.

As the measurement efficiency represented by Equation (1) is closer to zero, a shorter processing time is required for the analysis process and the diagnosis process than the measurement interval. On the other hand, as the measurement efficiency is closer to 1, the processing time required for the analysis process and the diagnosis process is closer to the measurement interval, and a waiting time until the start of a subsequent measurement is shorter. When the measurement efficiency exceeds 1, the analysis process and the diagnosis process do not end within the measurement interval, and accordingly, the real-time process is compromised.

Calculation controller 36 calculates this measurement efficiency for each measurement interval. Calculation controller 36 then sets the measurement conditions of data measurement device 20 based on the calculated measurement efficiency, and outputs the details of setting to data measurement device 20. For example, calculation controller 36 adjusts each measurement item to reduce the measurement interval and increase the sampling frequency when the measurement efficiency is less than 1, and adjusts each measurement item to increase the measurement interval and reduce the sampling frequency when the measurement efficiency is not less than 1.

Calculation controller 36 sets the analysis condition for the analysis process based on the calculated measurement efficiency, and outputs the details of setting to calculator 34. For example, when the measurement efficiency is low, calculation controller 36 sets the analysis condition such that FFT calculation for frequency analysis, CF calculation, and any other calculation are further performed in addition to RMS calculation in the analysis process, because there is room for the process. On the other hand, when the measurement efficiency is high, calculation controller 36 sets the analysis condition so as to limit the calculations performed in the analysis process to some calculations (e.g., only RMS calculation and EFT calculation, or only RMS calculation), because there is no room for the process.

Although setting (adjustment) of the measurement conditions and setting of the analysis condition may be performed independently, in the present embodiment, the analysis condition is set when the adjustment of the measurement conditions is not included in a prescribed adjustment range (which will be described below). As described above, analysis items can be limited depending, on change of the analysis condition the measurement conditions are adjusted preferentially over changing of the analysis condition in order to maintain state monitoring as extensively as possible, and the analysis condition is set (changed) when the real-time process cannot be ensured by adjusting the measurement conditions.

FIG. 3 shows an example measurement condition setting table included in calculation condition file 32. Referring to FIG. 3, measurement items are setting items of the measurement conditions and include, for example, a measurement interval, a measurement time, and a sampling frequency. The initial setting value is an initial value of each measurement item before adjustment of each measurement item by calculation controller 36.

A setting value (worst-case condition), a setting value (desired condition), and a setting value (best-case condition) define adjustment ranges of the respective measurement items. The setting value (worst-case condition) indicates a worst-case value of each measurement item. The setting value of each of the measurement interval and the measurement time is relatively large, and a setting value of the sampling frequency is relatively small. The setting value (desired condition) indicates a desired value of each measurement item. The setting value (best-case condition) indicates a best-case value of each measurement item. The setting value of each of the measurement interval and the measurement time is relatively small, and the setting value of the sampling frequency is relatively large.

As described above, calculation controller 36 sets measurement conditions based on a measurement efficiency. Specifically, when the measurement efficiency is smaller than 1, calculation controller 36 adjusts a setting value of each measurement item to the direction of the "setting value (best-case condition)". On the other hand, when the measurement efficiency is not less than 1, calculation controller 36 adjusts a setting value of each measurement item to the direction of the "setting value (worst-case condition)". In a specific adjustment method, for example, the measurement items are prioritized, and setting values are adjusted based on the measurement efficiency starting from a measurement item with the highest priority.

At a measurement efficiency lower than 1, when the setting value of each measurement item is adjusted between the "setting value (desired condition)" and the "setting value (best-case condition)", calculation controller 36 ends a setting process. At a measurement efficiency not less than 1, when the setting value of each measurement item is adjusted between the "setting value (worst-case condition)" and the "setting value (best-case condition)", calculation controller 36 ends the setting process and sets the analysis level and the analysis condition.

An ID in the table is a number provided to each measurement item. Although an ID is provided for each item also in the tables shown in FIGS. 4 and 5, which will be described below, the IDs are numbers for differentiation of items in each table, and the items are not associated using the IDs between the tables.

FIG. 4 shows an example analysis level setting table included in calculation condition file 32. Referring to FIG. 4, the details of the analysis process performed in calculator 34 are defined depending on the analysis level set using this analysis level setting table. Though described below in detail with reference to FIG. 5, in the present embodiment, the types of analysis calculations in the analysis process are limited more (e.g., only the RMS calculation) as the analysis level is lower, and the types of analysis calculations increase (e.g., the FFT and CF calculations in addition to the RMS calculation) as the analysis level is higher.

The analysis level is determined based on the measurement efficiency. In the present embodiment, when a measurement efficiency R is not less than 0 and less than 0.5, the analysis level is set to 3 because there is room for the process. When measurement efficiency R is not less than 0.5 and less than 0.8, the analysis level is set to 2. When measurement efficiency R is not less than 0.8, the analysis level is set to 1 because there is no room for the process.

FIG. 5 shows an example analysis process setting table included in calculation condition file 32. Referring to FIG. 5, the calculation type indicates the type of an analysis calculation that can be performed in the analysis process, and in this example, includes an RMS calculation, an FFT calculation for frequency analysis, and a CF calculation. The calculation parameter indicates a passband of a band pass filter (BPF) as preprocessing on measurement data received from data measurement device 20.

The diagnosis level indicates a level of a diagnosis result in diagnosis device 40 which is based on the result of the analysis process. For example, when the bearing vibration data is collected by sensor unit 10 including a vibration sensor, a damage level of the bearing is diagnosed through comparison of the analysis result (e.g., RMS, FFT spectrum, CF of vibrations data) with a prescribed threshold, and is indicated as the diagnosis level. The analysis level is determined based on the measurement efficiency using the analysis level setting table shown in FIG. 4.

As shown in the figure, in the present embodiment, the calculation type of the analysis process is determined according to the analysis level determined based on the measurement efficiency. In this example, when the analysis level is 1 (measurement efficiency R≥0.8), only the RMS calculation is performed in the analysis process. When the analysis level is 2 (0.5≤measurement efficiency R<0.8), the FFT calculation for frequency analysis is performed in addition to the RMS calculation in the analysis process. When the analysis level is 3 (0≤measurement efficiency R<0.5), the CF is calculated further in addition to the RMS and FFT calculations in the analysis process.

In the present embodiment, also, the calculation parameter is set according to the diagnosis level of the diagnosis by diagnosis device 40. In this example, when the diagnosis level by diagnosis device 40 is 0, the calculation parameter (the passband of the BPF for the measurement data) is set to f01 to f02 kHz when the calculation type is the RMS, the calculation parameter is set to f11 toy f12 kHz when the calculation type is the FFT, and the calculation parameter is set to f21 to f22 kHz when the calculation type is the CF.

When the diagnosis level by diagnosis device 40 is 1, the calculation parameter is set to f31 to f32 kHz when the calculation type is the RMS, the calculation parameter is set to f41 to f42 kHz when the calculation type is the FFT, and the calculation parameter is set to f51 to f52 kHz when the calculation type is the CF. Further, when the diagnosis level by diagnosis device 40 is 2, the calculation parameter is set to f61 to f62 kHz when the calculation type is the RMS, the calculation parameter is set to f71 to f72 kHz when the calculation type is the FFT, and the calculation parameter is set to f81 to f82 kHz when the calculation type is the CF.

As described above, in the present embodiment, the measurement efficiency is calculated based on the time required for the analysis process and the diagnosis process, and the details (calculation type) of the analysis process are set according to the analysis level set based on the measurement efficiency. The details (calculation parameter) of the analysis process are set based on the result of the diagnosis process (diagnosis level) by diagnosis device 40.

Calculation condition file 32 including the respective setting tables of FIGS. 3 to 5 are stored in a storage device (not shown), such as a hard disk drive (HDD) or a solid state drive (SSD).

Referring again to FIG. 2, calculation controller 36 outputs measurement conditions set (adjusted) based on the measurement efficiency to data measurement device 20. Data measurement device 20 then measures data according to the measurement conditions received from data analyzer 30 (calculation controller 36).

Calculation controller 36 also outputs the set analysis condition (such as the calculation type and the calculation parameter of the analysis process) to calculator 34. Calculator 34 then performs the analysis process on the measurement data received from data measurement device 20, according to the analysis condition received from calculation controller 36.

Diagnosis device 40 includes a diagnosis condition file 42 and a diagnosis unit 44. Diagnosis condition file 42 includes a diagnosis condition for the diagnosis process performed in diagnosis unit 44. For example, diagnosis condition file 42 includes a determination threshold for determining the level of the diagnosis result (diagnosis level) performed on the analysis result by data analyzer 30 in diagnosis unit 44.

Diagnosis unit 44 receives, from calculator 34 of data analyzer 30, the result of the analysis process performed by calculator 34 according to the analysis condition set by calculation controller 36. Diagnosis unit 44 then refers to diagnosis condition file 42 to perform the diagnosis process based on the analysis result received from data analyzer 30. Diagnosis unit 44 transmits the diagnosis result through the diagnosis process to data analyzer 30 (calculation controller 36).

Diagnosis unit 44 further counts a time required for the diagnosis process (diagnosis process time). Diagnosis unit 44 then outputs the counted diagnosis process time to data analyzer 30 (calculation controller 36) together with the diagnosis result.

Figure 6:
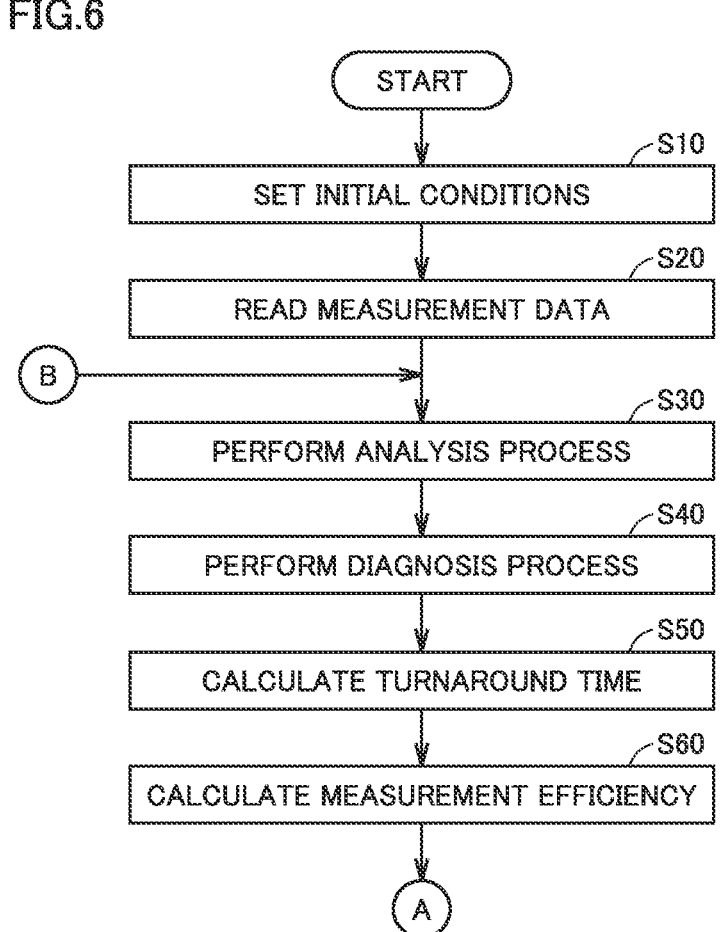
FIG. 6 is a first flowchart showing an example procedure of a process performed in the condition monitoring system.
Figure 7:
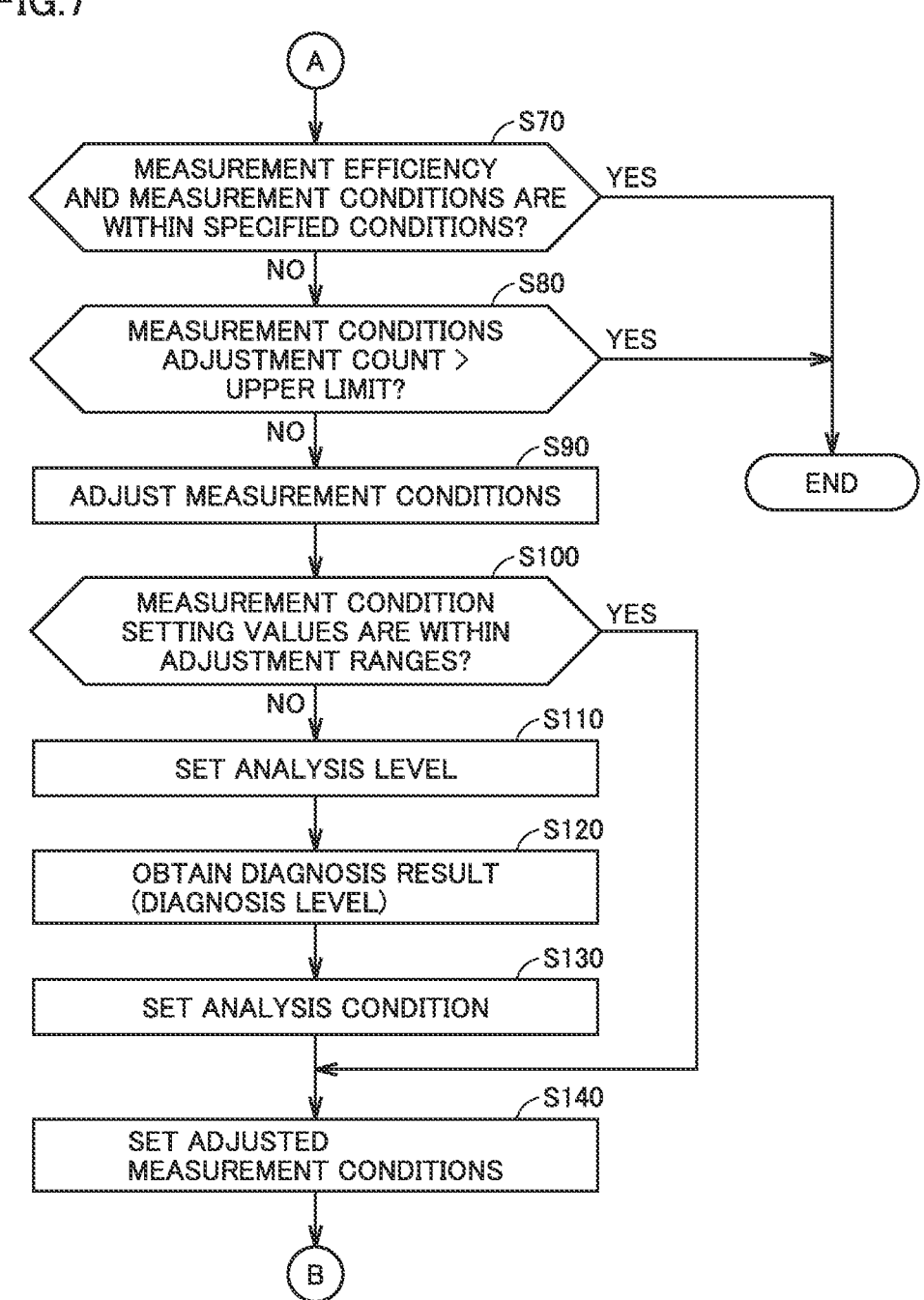
FIG. 7 is a second flowchart showing the example procedure of the process performed in the condition monitoring system.

FIGS. 6 and 7 show flowcharts showing an example procedure of the process performed in condition monitoring system 100 according to the present embodiment. The process of this flowchart is performed every time a prescribed condition is met. For example, the process of this flowchart may be performed periodically or performed when a change has occurred in the diagnosis result by diagnosis device 40.

Referring to FIG. 6, first, data analyzer 30 initializes the measurement conditions and the analysis condition with reference to calculation condition file 32 (step S10). Specifically, for the measurement conditions, each of the measurement interval, the measurement time, and the sampling frequency is set to an initial setting value of the measurement condition setting table shown in FIG. 3. Data analyzer 30 transmits such initial setting values as the measurement conditions to data measurement device 20. Data measurement device 20 starts data measurement according to the initial setting of the measurement conditions received from data analyzer 30.

For the analysis condition, the analysis level is initialized to the highest level (analysis level 3 in this example), and the diagnosis level is initialized to the lowest level (diagnosis level 0 in this example). Then, referring to the analysis process setting table shown in FIG. 5, each of the RMS, FFT, and CF calculations is set as the initial setting of the calculation type in the analysis process based on the initial setting values of the analysis level and the diagnosis level.

When the measurement conditions and the analysis condition are initialized, data analyzer 30 starts reading the measurement data from data measurement device 20 (step S20). Data analyzer 30 then performs the analysis process on the measurement data received from data measurement device 20, according to the set analysis condition (step S30). As described above, each of the RMS, FFT, and CF calculations is performed on the read measurement data in the initial setting. Data analyzer 30 calculates a time required for the execution of the analysis process (analysis process time). Data analyzer 30 then transmits the execution result of the analysis process (analysis result) to diagnosis device 40.

When data analyzer 30 performs the analysis process, diagnosis device 40 performs the diagnosis process on the analysis result (step S40). Diagnosis device 40 determines the diagnosis level of the analysis result received from data analyzer 30, with reference to diagnosis condition file 42. Diagnosis device 40 also calculates a time required for the execution of the diagnosis process (diagnosis process time). Diagnosis device 40 then transmits the result of the diagnosis process (diagnosis level) and the diagnosis process time to data analyzer 30.

Upon receipt of the diagnosis result and the diagnosis process time from diagnosis device 40, data analyzer 30 calculates a turnaround time of the overall process including the analysis process and the diagnosis process (step S50). In this example, the total time of the analysis process time calculated during the execution of the analysis process and the diagnosis process time received from diagnosis device 40 is calculated as the turnaround time.

Data analyzer 30 then calculates a measurement efficiency by Equation (1) above from the measurement interval set as the measurement conditions and the calculated turnaround time (step S60).

Referring to FIG. 7, data analyzer 30 determines whether the calculated measurement efficiency and the measurement conditions are within the specified conditions (step S70). Specifically, at a measurement efficiency less than 1, data analyzer 30 determines that the measurement efficiency and the measurement conditions are within the specified conditions when the setting value of each measurement item of the measurement conditions (FIG. 3) is between the "setting value (desired condition)" and the "setting value (best-case condition)". However, at an analysis level of 1, data analyzer 30 determines that the measurement efficiency and the measurement conditions are within the specified conditions when the setting value of each measurement item is between the "setting value (worst-case condition)" and the "setting value (best-case condition)".

When determining that the measurement efficiency and the measurement conditions are within the specified conditions at step S70 (YES at step S70), data analyzer 30 determines that the diagnosis process has been performed in real time, and the process proceeds to END.

When determining that the measurement efficiency and the measurement conditions are not within the specified conditions at step S70 (NO at step S70), data analyzer 30 determines whether an adjustment count of the measurement conditions exceeds the upper limit (step S80). The adjustment of the measurement conditions will be described at step S90. The upper limit is appropriately set to a count which is usually enough to adjust the measurement efficiency and the measurement conditions within the specified conditions.

When determining that the adjustment count of the measurement conditions exceeds the upper limit (YES at step S80), data analyzer 30 determines that the real-time process cannot be performed, and the process proceeds to END. Though not particularly shown, in this case, the adjustment count of the measurement conditions exceeding the upper limit may be displayed on display device 50.

On the other hand, when determining that the adjustment count of the measurement conditions is still not greater than the upper limit at step S80 (NO at step S80), data analyzer 30 adjusts the measurement conditions (step S90). Specifically, data analyzer 30 adjusts the setting value of each measurement item to the direction of the "setting value (best-case condition)" (FIG. 3) when the measurement efficiency is less than 1, and adjusts the setting value of each measurement item to the direction of the "setting value (worst-case condition)" when the measurement efficiency is not less than 1. On that occasion, measurement items can be prioritized, and setting values can be adjusted based on a measurement efficiency, starting from a measurement item with the highest priority.

The method of adjusting the measurement conditions is not limited to such a method, and various methods can be used. For example, the setting value of each measurement item is taken as a design variable, and the normalized difference between the setting value of the best-case condition or desired condition and the setting value of each measurement item at that time may be taken as an objective variable. Then, an optimization technique such as the steepest descent method may be used to adjust the design variable such that the objective variable approaches zero.

Data analyzer 30 then determines whether the setting values of the adjusted measurement conditions are included in prescribed adjustment ranges (step S100). The prescribed adjustment range is, for example, the range from the "setting value (worst-case condition)" to the "setting value (best-case condition)" shown in FIG. 3. When determining that the setting values of the measurement conditions are included in the prescribed adjustment ranges (YES at step S100), data analyzer 30 sets the measurement conditions adjusted at step S90 to data measurement device 20 (step S140). As measurement conditions are set, the process proceeds back to step S30 of FIG. 6, and the analysis process based on the adjusted measurement data is performed.

When determining that the setting values of the measurement conditions are not included in the prescribed adjustment ranges at step S100 (NO at step S100), data analyzer 30 sets the analysis condition. In other words, data analyzer 30 refers to the analysis level setting table (FIG. 4) included in calculation condition file 32 to set the analysis level based on the measurement efficiency calculated at step S60 (FIG. 6) (step S110).

Data analyzer 30 then obtains the diagnosis result (diagnosis level) of diagnosis device 40 (step S120). Data analyzer 30 then refers to the analysis process setting table included in calculation condition file 32 (FIG. 5) to set the analysis condition for the analysis process based on the analysis level set at step S110 and the diagnosis level obtained at step S120 (step S130). Specifically, data analyzer 30 refers to the analysis process setting table (FIG. 5) to set the calculation type (such as RMS calculation, FFT calculation, CF calculation) and the calculation parameter (the passband of the BPF for measurement data) of the analysis process according to the analysis level and the diagnosis level. Subsequently, the process proceeds to step S140, and the measurement conditions adjusted at step S90 are set.

As described above, in the present embodiment, the measurement condition (each measurement item) us set based on the measurement efficiency determined according to the time required for the analysis process and the diagnosis process. Also, the analysis condition (analysis calculation type) is set according to the analysis level set based on the measurement efficiency. As a result, the measurement condition and the analysis condition can be set such that the time required for the analysis process and the diagnosis process does not exceed the measurement interval of the measurement data. According to the present embodiment, thus, the real-time process can be ensured.

Also in the present embodiment, the analysis condition (calculation type) is set according to the analysis level corresponding to the measurement efficiency when the measurement condition is not included in the prescribed adjustment range (e.g., the range from the setting value (worst-case condition) to the setting value (best-case condition (FIG. 3)). According to the present embodiment, thus, the analysis condition (calculation type) is not changed unnecessarily as long as the measurement condition is included in the adjustment range.

It is to be understood that the embodiment disclosed herein is presented for the purpose of illustration and non-restrictive in every, respect. It is therefore intended that the scope of the present invention is defined by claims, not only by the embodiment described above; and encompasses all modifications and variations equivalent in meaning and scope to the claims.

REFERENCE SIGNS LIST

10 sensor unit; 20 data measurement device; 30 data analyzer; 32 calculation condition file; 34 calculator; 36 calculation controller; 40 diagnosis device; 42 diagnosis condition file; 44 diagnosis unit; 50 display device; 60 communication system.

The invention claimed is:

1. A condition monitoring system that monitors a condition of a wind power generation facility, the condition monitoring system comprising:

a sensor attached to the wind power generation facility, the sensor including a vibration sensor detecting vibration of a main bearing of the wind power generation facility;

a data measurement device including a programmable logic controller that receives a detection signal of the sensor and obtains, according to a measurement condition provided, measurement data from the detection signal;

a data analyzer including a first central processing unit (CPU) that receives the measurement data from the data measurement device and performs an analysis process on the measurement data; and a diagnosis device including a second CPU that performs a diagnosis process of diagnosing the condition of the wind power generation facility based on comparing an analysis result obtained through the analysis process to a prescribed threshold to identify a damage level of the main bearing of the wind power generation facility, wherein the data analyzer adjusts the measurement condition based on a measurement efficiency such that a time required for the analysis process and the diagnosis process does not exceed a measurement interval of the measurement data in the data measurement device, the measurement efficiency indicating a relation between the measurement interval of the measurement data and the time required for the analysis process and the diagnosis process, wherein the data analyzer calculates the measurement efficiency for each measurement interval and adjusts the measurement condition for each measurement interval based on the calculated measurement efficiency, wherein the data analyzer sets the analysis condition when the adjusted measurement condition is determined to be outside of a prescribed adjustment range, wherein the data analyzer outputs the adjusted measurement condition to the data measurement device, and wherein the data measurement device obtains the measurement data according to the adjusted measurement condition.

2. The condition monitoring system according to claim 1, wherein the data analyzer sets the analysis condition based on the measurement efficiency and a result of the diagnosis process.

3. The condition monitoring system according to claim 1, wherein the sensor further includes at least one of a temperature sensor, a pressure sensor, a strain sensor, and a load sensor.

4. A data analyzer that performs an analysis process on measurement data received from a data measurement device, the data measurement device configured to obtain, according to a measurement condition provided, the measurement data from a detection signal of a sensor attached to a facility, the data analyzer comprising:

a central processing unit (CPU) configured to:

perform the analysis process on the measurement data;

adjust the measurement condition based on a measurement efficiency such that a time required for the analysis process and a diagnosis process of diagnosing a condition of the facility does not exceed a measurement interval of the measurement data in the data measurement device, the measurement efficiency indicating a relation between the measurement interval of the measurement data and the time required for the analysis process and the diagnosis process;

sets the analysis condition when the adjusted measurement condition is determined to be outside of a prescribed adjustment range; and outputs the adjusted measurement condition to the data measurement device to facilitate the data measurement device to obtain the measurement data according to the adjusted measurement condition, wherein the CPU calculates the measurement efficiency for each measurement interval and adjusts the measurement condition for each measurement interval based on the calculated measurement efficiency.

5. The data analyzer according to claim 4, wherein the CPU sets the analysis condition based on the measurement efficiency and a result of the diagnosis process.

6. The data analyzer according to claim 4, wherein the sensor further includes at least one of a temperature sensor, a pressure sensor, a strain sensor, and a load sensor.

* * * * *